United States Patent
Jones et al.

(10) Patent No.: US 6,611,226 B1
(45) Date of Patent: Aug. 26, 2003

(54) SATELLITE SURVEILLANCE SYSTEM AND METHOD

(76) Inventors: David A. Jones, 19722 Hatton St., Canoga Park, CA (US) 91306; Henry L. McCord, 3237 Colby Ave., Los Angeles, CA (US) 90066; Paul A. Jensen, 1322 Kensington Dr., Fullerton, CA (US) 92831; Eric B. Jensen, 503 24th St., Hermosa Beach, CA (US) 90254; James M. Knight, 143 Whiting St., #2, El Segundo, CA (US) 90245

( * ) Notice: Subject to any disclaimer, the term of this patent is extended or adjusted under 35 U.S.C. 154(b) by 0 days.

(21) Appl. No.: 10/119,961

(22) Filed: Apr. 10, 2002

Related U.S. Application Data

(62) Division of application No. 09/553,709, filed on Apr. 20, 2000, now abandoned.

(51) Int. Cl.$^7$ ................................................ G01S 13/52
(52) U.S. Cl. ...................................... 342/160; 342/352
(58) Field of Search .............................. 342/160, 350, 342/352, 353, 354

(56) References Cited

U.S. PATENT DOCUMENTS

| | | | |
|---|---|---|---|
| 3,699,577 A | * 10/1972 | Shadle | 343/112 R |
| 3,725,924 A | * 4/1973 | Easton | 343/10 |
| 4,161,734 A | * 7/1979 | Anderson | 343/100 ST |
| 4,425,566 A | 1/1984 | Dragone | 343/781 P |
| 4,439,773 A | 3/1984 | Chu | 343/778 |
| 4,482,897 A | 11/1984 | Dragone et al. | 343/779 |
| 4,595,929 A | 6/1986 | Kreutel | 343/781 P |
| 4,755,826 A | 7/1988 | Rao | 343/781 P |
| 4,792,813 A | 12/1988 | Rosen | 343/781 P |
| 5,459,475 A | 10/1995 | Shen et al. | 343/781 P |
| 5,520,356 A | 5/1996 | Ensley | 244/62 |
| 6,272,317 B1 | 8/2001 | Houston et al. | 455/13.1 |
| 6,285,318 B1 | * 9/2001 | Schoen et al. | 342/357.16 |

* cited by examiner

*Primary Examiner*—Dao Phan

(57) ABSTRACT

A radar surveillance system includes a plurality of satellites a plurality of medium earth orbit satellites to provide continuous, long dwell coverage of a region of interest. Each satellite has an antenna having a main reflector and a subreflector electromagnetically coupled to the main reflector. A phased array generates multiple electromagnetic beams positioned so the electromagnetic beams reflect from the subreflector onto said main reflector. The system may be used in determining slow moving targets using a combination of monopulse anomaly and target spectral width measurements. The system also performs synthetic aperture radar imagery and focussed area fast moving target detection using alternating slope linear frequency modulated pulses. The plurality of medium Earth orbit satellites include a self-contained communications system consisting of high bandwidth self-relay crosslinks, high bandwidth downlink, and direct broadcast downlinks for processed data.

12 Claims, 11 Drawing Sheets

SATELLITE SURVEILLANCE SYSTEM AND METHOD

CROSS REFERENCE TO RELATED APPLICATION

The present application is a divisional of U.S. patent application Ser. No. 09/553,709, filed Apr. 20, 2000, now abandoned.

TECHNICAL FIELD

The present invention relates to surveillance satellites, and more particularly, to a system and antenna configuration for a multiple beam radar surveillance satellite, particularly suitable for being operated in medium earth orbits (MEO).

BACKGROUND ART

Various radar surveillance systems have been proposed using low Earth orbit satellites. One drawback to low earth orbit satellites is that a large constellation is required to provide continuous surveillance coverage. Large low Earth orbit constellations may include dozens of satellites to provide adequate surveillance over a given region of interest. A significant drawback to providing such number of satellites is cost and complexity. To launch and maintain such a system may be cost prohibitive. Also, additional sensor and communications capabilities, due to cost reasons, may be eliminated from the satellite to attempt to reduce these high costs. However, by reducing these features, the flexibility and overall surveillance utility of the system is reduced. Ideally, the problem of persistent surveillance over a region of interest could be accommodated by a few satellites in geostationary orbit. However, the size of the antenna and amount of transmitter power are strong functions of distance to the target being detected and therefore make satellites at geostationary orbits prohibitively large. This is undesirable in many circumstances.

It is desirable that a radar surveillance satellite be able to surveill and track targets almost simultaneously over a wide area within the satellites instantaneous field of regard. A way to achieve this capability is to employ an antenna that allows electronic beam steering, so that swaths hundreds of miles apart may be surveilled almost simultaneously (within a few seconds), and targets hundreds of miles apart may be tracked simultaneously by switching a beam of radar energy back and forth between them every few seconds.

From low Earth orbit, hundreds of miles distance on the ground translates into large angles (tens of degrees) at the satellite, so, for electronic beam steering to work, an electronically-steered phased-array antenna must be used. Such antenna are expensive, and compounded with the need for a large number of them required in low Earth orbit, may contribute to the excessive costliness of a low Earth orbit radar surveillance system.

In medium Earth orbit, the number of satellites needed for a radar surveillance system is drastically reduced. Also the angle over which the radar beam must rapidly steer, in order to simultaneously track targets hundreds of miles apart, is also drastically reduced (to a few degrees).

It would therefore be desirable to provide a satellite system having a constellation design that reduces the number of satellites compared to a low Earth orbit satellite system. It would also be desirable to provide a system that reduces the steering angle needed to simultaneously track targets that are hundreds of miles apart.

SUMMARY OF THE INVENTION

One object of the invention is to provide a surveillance satellite system having a reduced number of satellites with substantial surveillance coverage.

It is a further object of the invention to provide a system that allows continuous surveillance below 40° Latitude and provide less than 1 minute mean time to access below 70° Latitude.

In one aspect of the invention, a surveillance system includes a plurality of satellites a plurality of medium earth orbit satellites, each satellite having an antenna having a main reflector and a subreflector which is electromagnetically coupled to the main reflector. A phased array feed generates multiple electromagnetic beams positioned so the electromagnetic beams reflect from the subreflector onto the main reflector which collimates the beam for transmission to the surveilled region on the Earth's surface.

In a further aspect of the invention, a method of detecting slow moving targets takes advantage of the longer integration times available at the MEO altitude to improve target detectability and reduced false alarm rate. The method comprises the following processing steps which may be performed at the ground station:

establishing a discrete threshold;

obtaining a sum signal;

comparing the sum signal to the discrete threshold;

when the sum signal exceeds the discrete threshold, determining a monopulse anomaly;

when a monopulse anomaly is determined, classifying the signal as a stable mover;

when a monopulse anomaly is not found, statistically determining surrounding cells of an image to determine a power associated with interference or a discrete; when the power ratio is low, the cells are classified as interference or a discrete; when the power ratio is high, classifying as an unstable mover.

One advantage of the invention is that the satellite constellation supports various types of operations including communication network augmentation. If ground stations are located in a location far from the region of interest, the satellites may use the crosslinks to communicate the collected information to the appropriate satellite for downlinking for further processing. Another advantage of the invention is that the satellite payload may also be used passively to surveill electronic emanations from the area being surveilled or operate as a transmitter only to beam radar energy to the surveilled area for cooperative reception by airborne platforms to detect and track smaller targets of interest.

Other objects and features of the present invention will become apparent when viewed in light of the detailed description of the preferred embodiment when taken in conjunction with the attached drawings and appended claims.

BEST MODES FOR CARRYING OUT THE INVENTION

Figure 1:
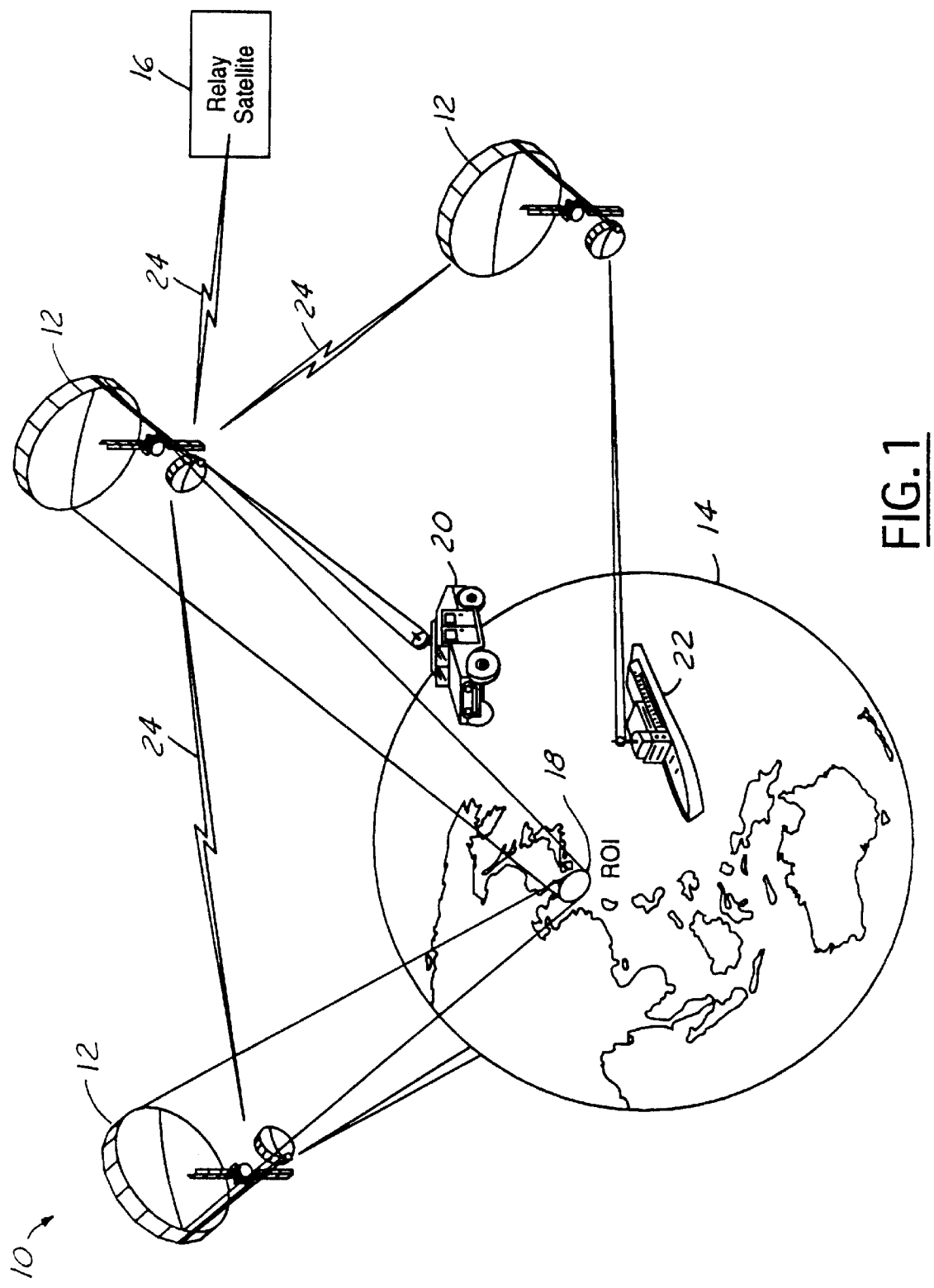
FIG. 1 is a partial system level view of a surveillance system according to the present invention.

In the following figures the same reference numerals will be used to identify the same components in the various views. In the following example, specific design parameters are provided for illustrative purposes only and are not meant to be limiting. Those skilled in the art would recognize that various other parameters may be used without varying from the spirit of the invention.

Referring now to FIG. 1, a surveillance system 10 has a plurality of satellites 12 positioned above earth 14. In addition, system 10 may also include a relay satellite 16 or number of relay satellites that-otherwise do not perform surveillance. As will be described below, in certain situations, the surveillance satellites 12 may act as self-relay satellites 16. Although only three satellites 12 are shown, various numbers of satellites may be included in the system. Satellites 12 are preferably medium Earth orbit (MEO) satellites having an orbit about 10,000 kilometers above earth 14. To provide substantial coverage of the earth 14, five satellites may be used. However, in the preferred embodiment eight satellites are used having an inclination of 31.5° using Walker phasing of 8/8/2. The inclination, altitude and phasing were chosen to provide long dwell capacity that operates from 8° to 70° grazing angle and 360° of azimuth for detecting and tracking of moving targets, and with a max slope angle limitation of 70° for synthetic aperture radar. The desire was to attain a system having substantially worldwide coverage and a potential for redundant coverage over a region of interest (ROI) 18. A slightly larger constellation of 9 satellites at the same altitude in a 45° inclination also provides 100% worldwide coverage for the detection and tracking of moving targets with the same grazing angle constraints mentioned.

As will be further described below, satellites 12 preferably comprise multiple communication functions. For example, mobile vehicles 20 and ships 22 may be used to receive various signals from satellites 12. Also, crosslink signals 24 may provide communication between satellites 12,16. Crosslink signals 24 allow delivery of tasking, raw data and process moving target and radar imagery to various locations around earth 14. Various satellites 12 not observing a region of interest may act as a relay for the observing satellite and the downlink satellite.

Figure 2:
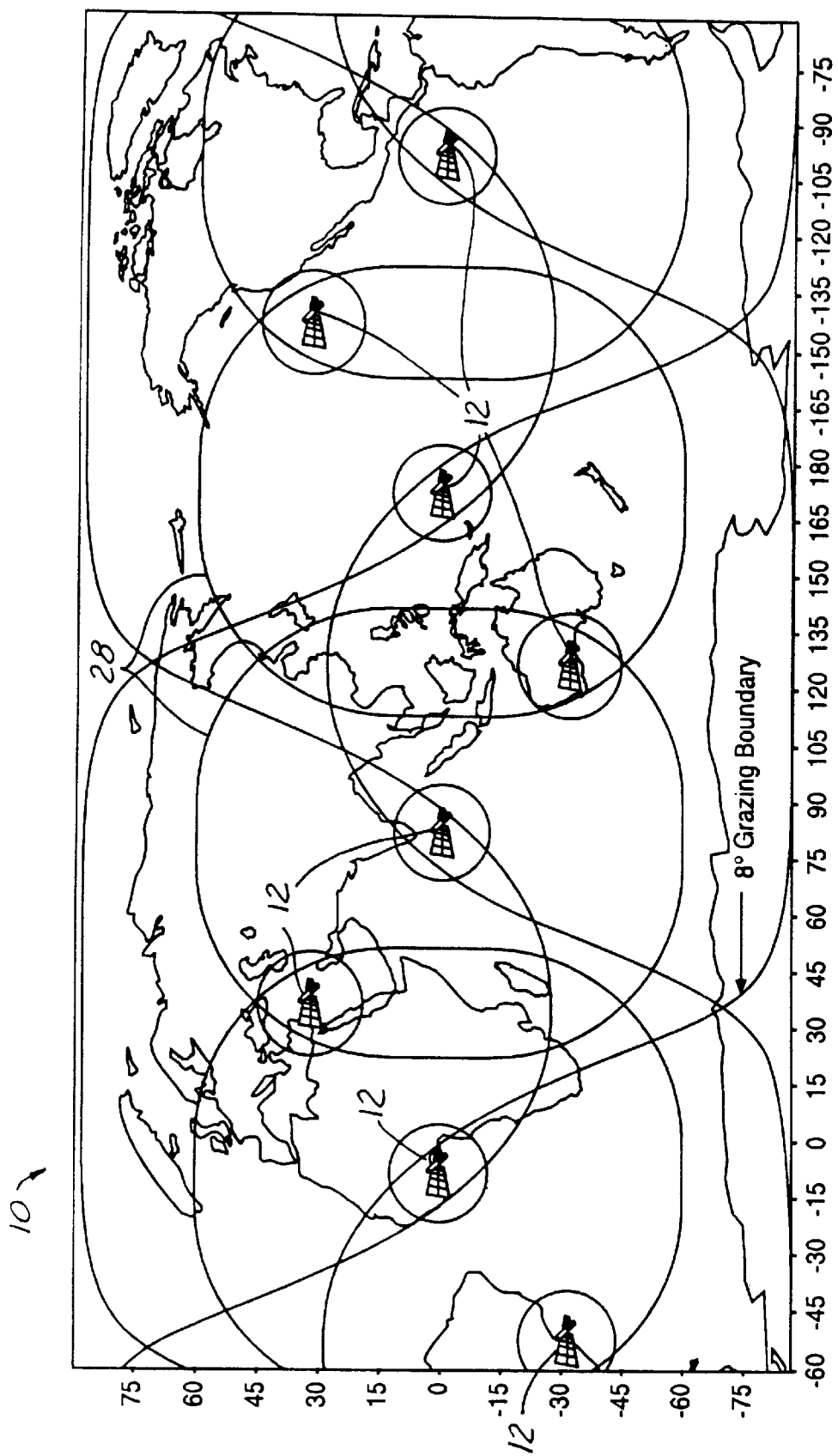
FIG. 2 is an equirectangular map showing satellite coverage in an eight satellite system according to the present invention.

Referring now to FIG. 2, an equirectangular map 26 of earth 14 is illustrated with the preferred eight satellites of the system 10. Satellites 12 as mentioned above may be positioned 10,000 kilometers above the earth with 31.5° of inclination. Given the radar grazing angle limits from 70° to 8°, this altitude corresponds to a very large field of regard for each satellite which allows a significant amount of overlap to enhance target geopositioning. The ground tracks 28 of each satellite are shown in FIG. 2.

Figure 3:
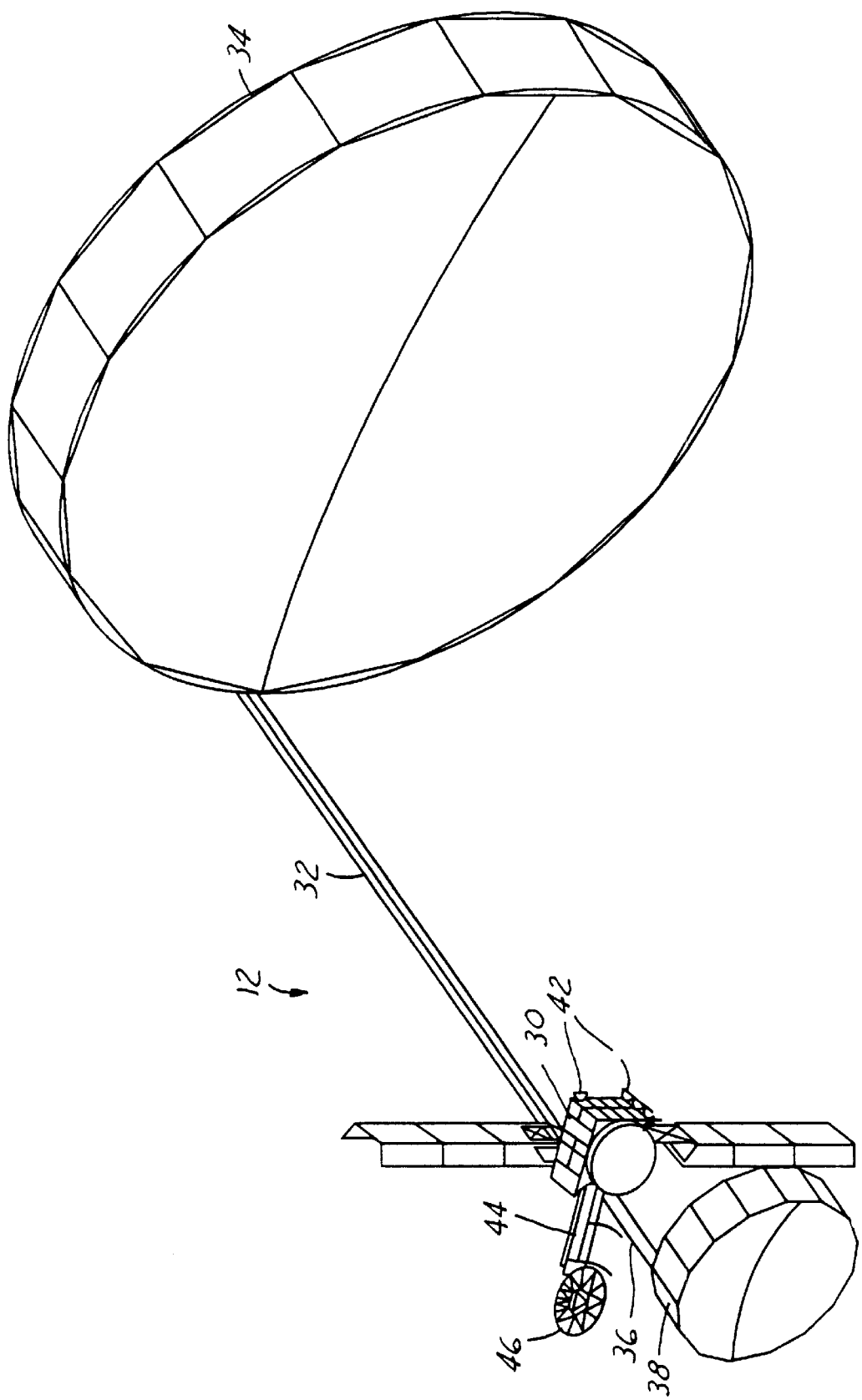
FIG. 3 is a perspective view of a satellite according to the present invention.
Figure 4:
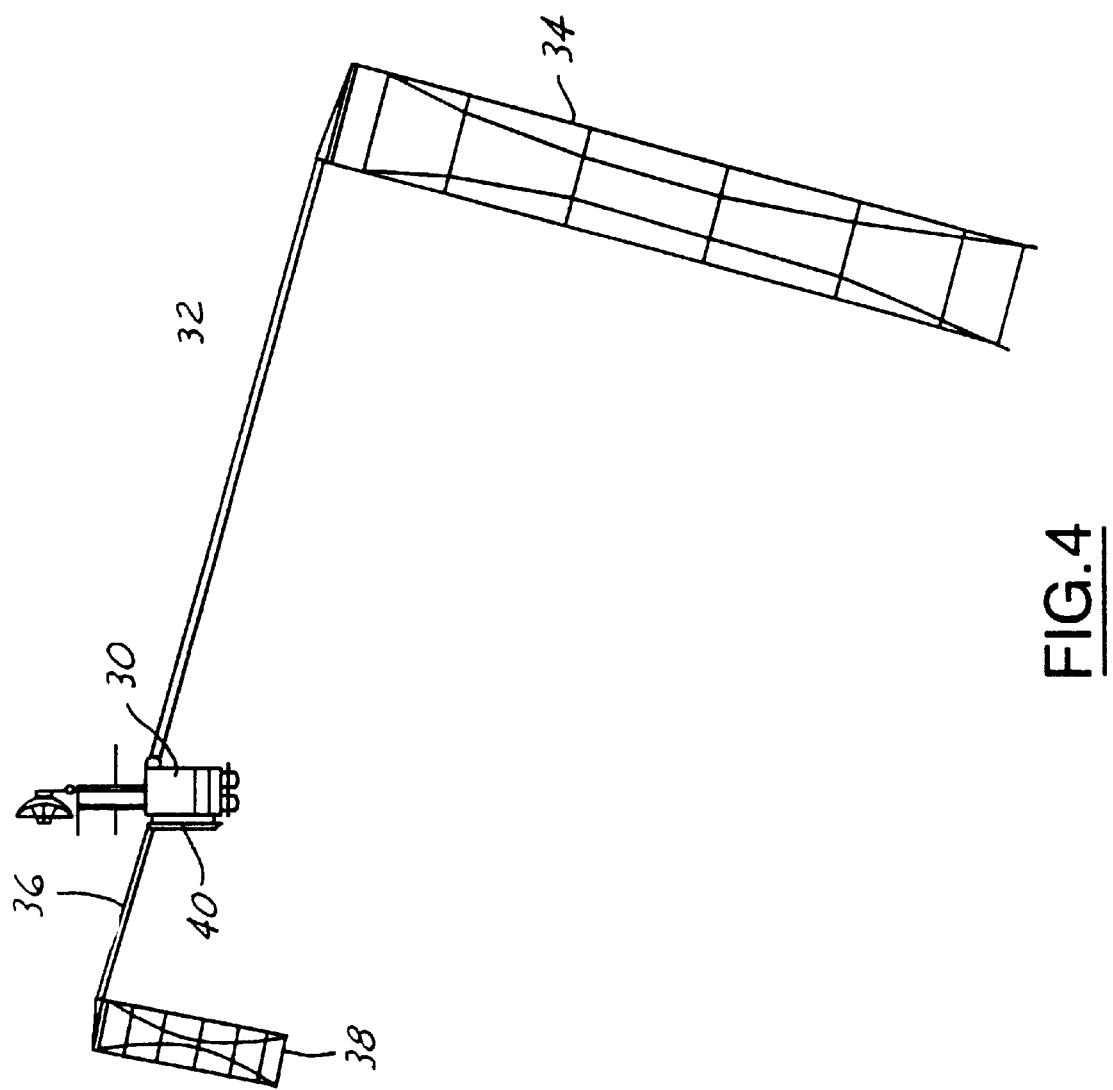
FIG. 4 is a side view of a deployed satellite according to the present invention.

Referring now to FIGS. 3 and 4, a preferred configuration of a satellite 12 is illustrated. Satellite 12 has a satellite body 30 that is used to house the control electronics for the satellite 12. Satellite body 30 has a primary mast 32 used to support a primary reflector 34. Body 30 also has a secondary mast 36 used to support secondary reflector 38. A feed array 40 comprised of a phased array feed is also coupled to satellite body 30. The positioning of phased array feed 40, secondary reflector 38, and primary reflector 34 will be further described below in FIGS. 5, 6, 7, and 8. Satellite body 30 also has optical crosslinks 42. Preferably, at least optical crosslinks are provided for communicating with other satellites in system 10.

A center mast 44 is used to position a direct downlink antenna 46. Antenna 46 may also be used for command uplinks. As will be described further below, other antennas may be coupled to the satellite body.

Figure 5:
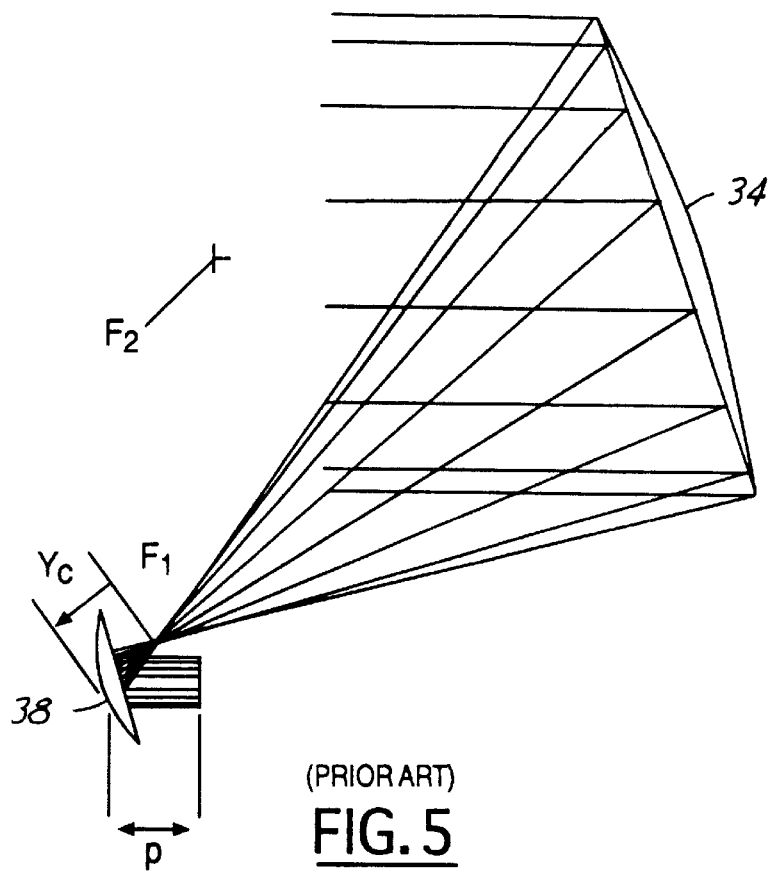
FIG. 5 is a side view of the antenna system according to the present invention.

Referring now to FIG. 5, in designing the system, it is desirable to allow the system components to be small enough to fit into the launch vehicle fairing when folded. Double confocal designs are typically used with magnifications from 2 to 4 times. The present application has magnifications between 8 and 10. The present invention attains approximately a 0.08 deg half power beamwidth over a region of +/−2.50 deg scan, or a scan of over 31 beamwidths.

In prior known antenna designs, the feed array 40 is positioned at a location which may intersect the caustic point C1 of the secondary reflector when the array is scanned. That is, the phased array is positioned at p where $p=(M_c+1)/M*Y_c$ where, $Y_c$ is the center ray-length from the focus to the subreflector. This is the conjugate point C1 of the reflector system which maps each point on the array to a single point on primary reflector 32. The problem with such a design is that at a negative scan angle, the feed array 40 blocks a portion of the beam reflected from the secondary reflector 38.

Figure 6:
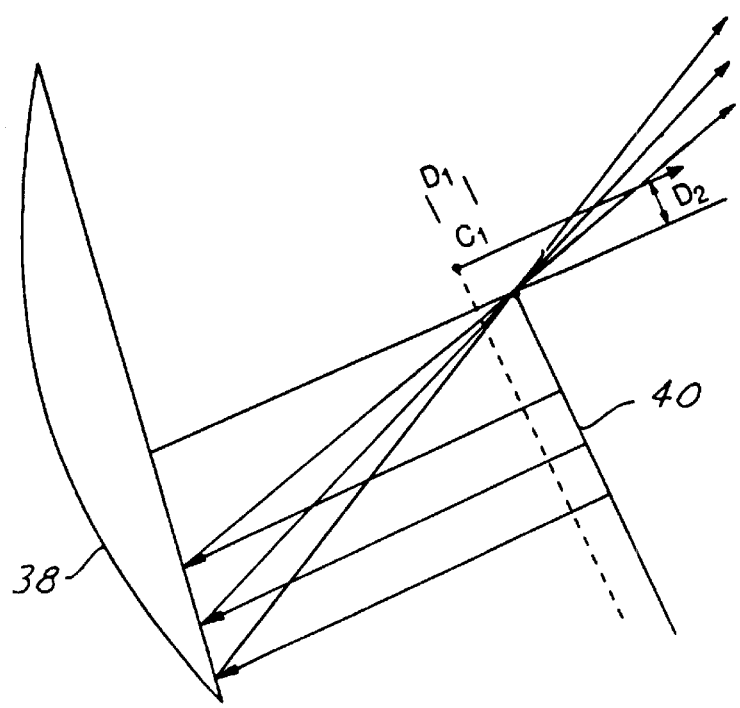
FIG. 6 is a side view of an antenna system at a −25° array scan according to the present invention.

Referring now to FIG. 6, a preferred orientation of feed array 40, primary reflector 34, and secondary reflector 38 is illustrated. The feed array 40 is positioned at a point a predetermined distance downward D1 and outward D2 from the previous position (from the conjugate) with respect to the secondary reflector 38. Thus, as shown, caustic 48 is positioned near edge 50.

Figure 7:
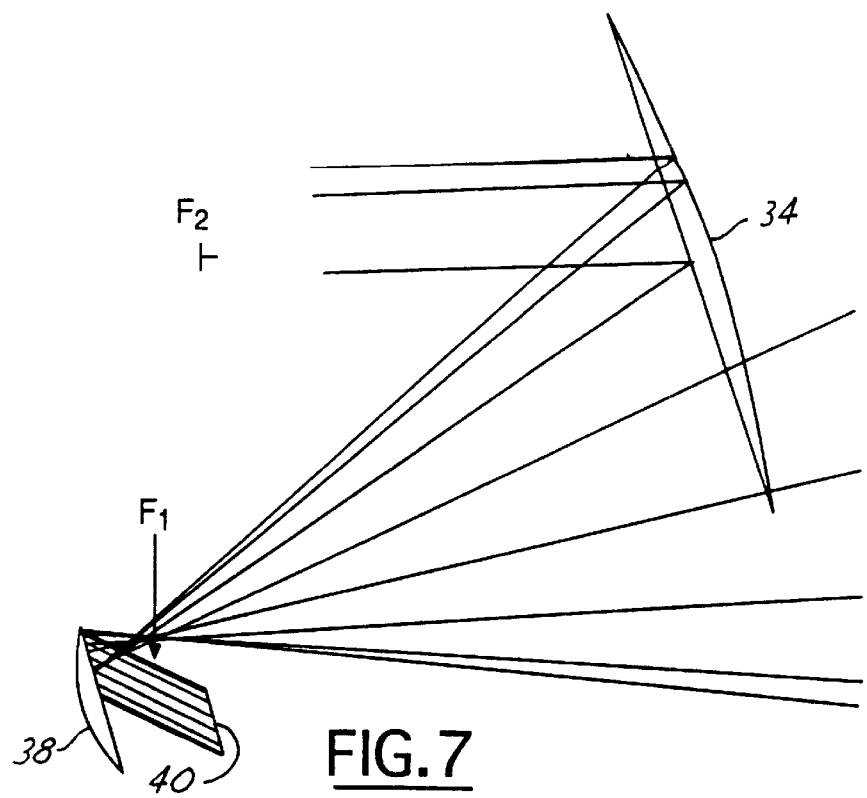
FIG. 7 is a side view of the antenna system in a positive array scan mode.

Referring now to FIG. 7, a positive array scan of the configuration of the present invention is illustrated. In the positive array scan, the vertical offset location of the array with respect to the subreflector can be varied. As the array scans, the amount of the main reflector illuminated changes. As illustrated, some spillover 52 is obtained. The optimal location of feed array 40 for the maximum field of view is a position where the offset of the array is such that some spillover occurs at the top of the reflector for the boresight position. This will actually result in less gain loss for the maximum positive array scan illustrated in FIG. 7. The focal length to diameter (F/d) of the reflectors is chosen so that a relatively small size array can be provided but still achieve the desired scan performance.

Figure 8:
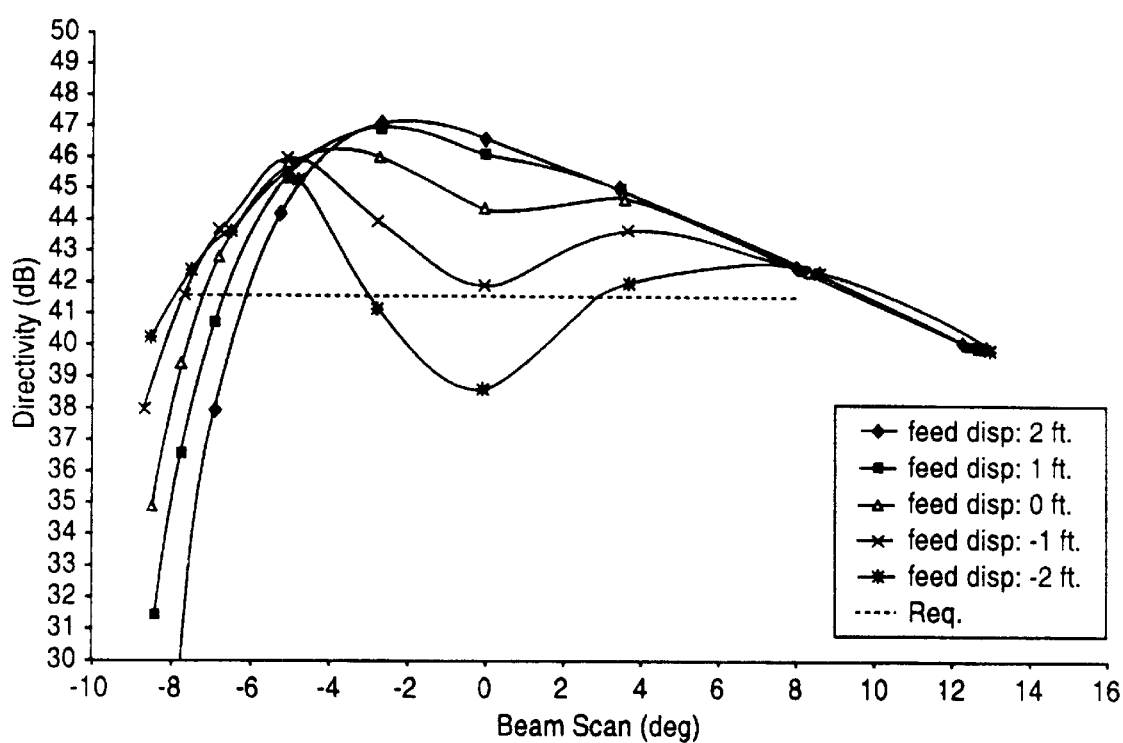
FIG. 8 is a plot of directivity (in decibels vs. beam scan degrees) of various antennas with various displacements.

Referring now to FIG. 8, a plot of gain vs. the beam scan angle in degrees is illustrated for various feed array displacements. As shown, various displacements may be used depending on the desired gain characteristics. As shown, some reduction in gain is obtained due to spillover, but the overall performance can be controlled not to degrade below a predetermined gain.

In addition to locating the distance from the subreflector to the array beyond the conjugate location and offsetting the array to optimize scan, the present invention may also be improved by placing phasors at each antenna element to compensate for reflector aberrations resulting from the scan.

In one desired embodiment, 661 radiating elements in a rectangular lattice with 1.4" element spacing was used. The reflector geometry was designed to magnify 10' diameter feed array to an effective 80' aperture of the primary reflector and provide about ±2.5° of secondary beam scan.

Figure 9:
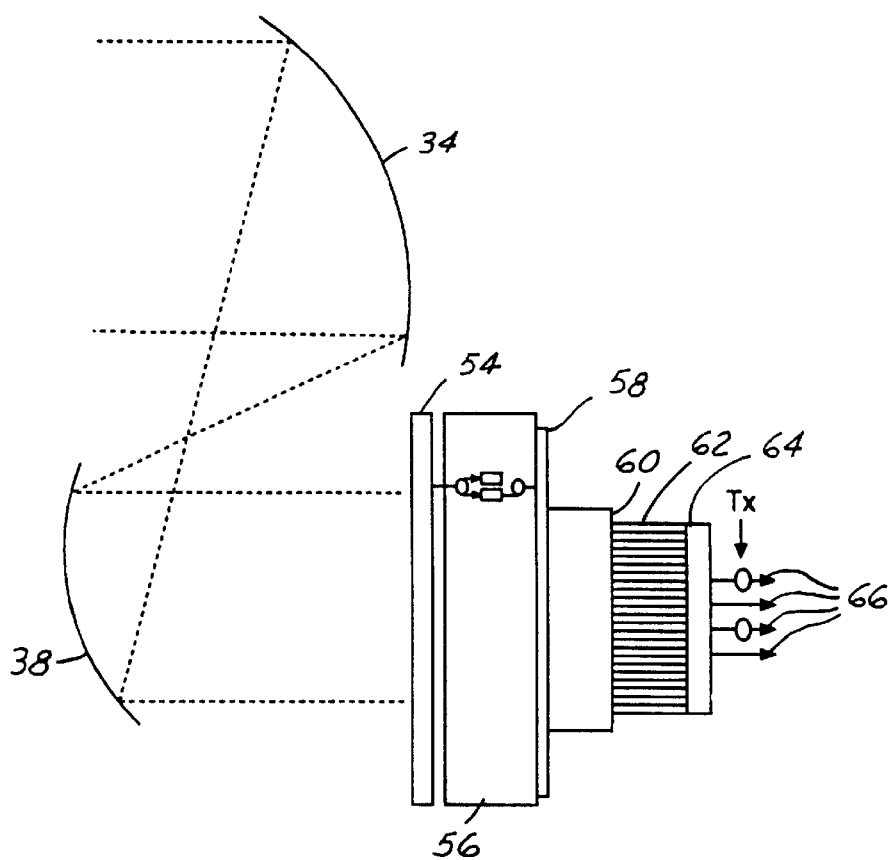
FIG. 9 is a diagrammatic view of the active feed system with respect to the reflectors of the antenna system.

Referring now to FIG. 9, an active feed array 54 consisting of a plurality of transmit/receive modules 56. The transmit/receive modules 56 are coupled to a stripline network 58. By cascading two sets of lenses, two-dimensional beam scanning is obtained. That is, a vertical array 60 of Rotman lenses and a horizontal array 62 of Rotman lenses may be used to provide multiple beams in two planes. A Rotman type lens is preferred because it is a true time delay device that allows the beam position to be independent of frequency. The horizontal array of Rotman lenses 62 is coupled to a beam switching network 64. The beam switching network 64 is used to form 3600 discrete spot beam positions to cover the region of interest (ROI). Various transmit and receive signals are coupled through input 66.

Figure 10:
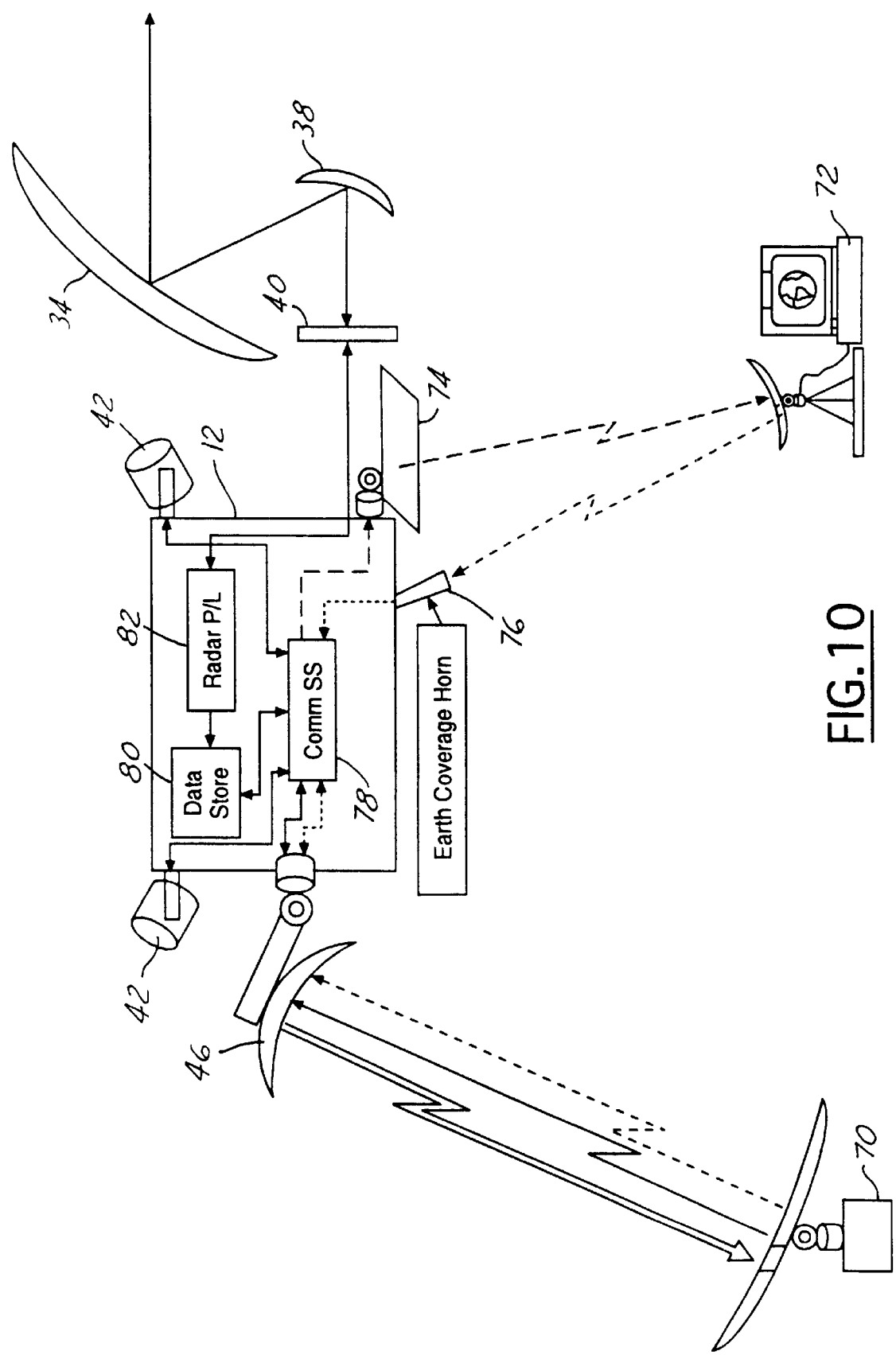
FIG. 10 is a block diagram of the communications architecture according to the present invention.

Referring now to FIG. 10, the system architecture for a satellite 12 is illustrated. Satellite 12 may communicate with a ground station 70 through the direct downlink antenna 46. The downlink antenna 46 may, for example, be a high data rate terminal generating two signals using 35 watts of power. For example, the two signals may be right hand circularly polarized and left hand circularly polarized. The antenna 46 may also be used for uplinking moving target and processed imagery data to the satellite 12. A smaller mobile terminal 72 may also be used to uplink user tasks to satellite 12 as well as receive processed downlink data from a phased array antenna 74. A broadbeam feed horn 76 may be used to receive uplink signals from mobile terminal 72.

Satellite 12 has a communication subsystem 78 coupled to antenna 46, feed horn 76, phased array antenna 74, and crosslinks 42. Communication subsystems controls the linking between the various communication antennas. For example, communications subsystem may receive the crosslinking signals from crosslink 42 and act as a relay whereby the signal is transmitted through to another satellite through the other crosslink. Communication subsystem 78 may be coupled to data storage 80 that received radar data from radar P/L 82. The data storage 80 may be used to store wide band radar phase history that may be later processed.

Figure 11:
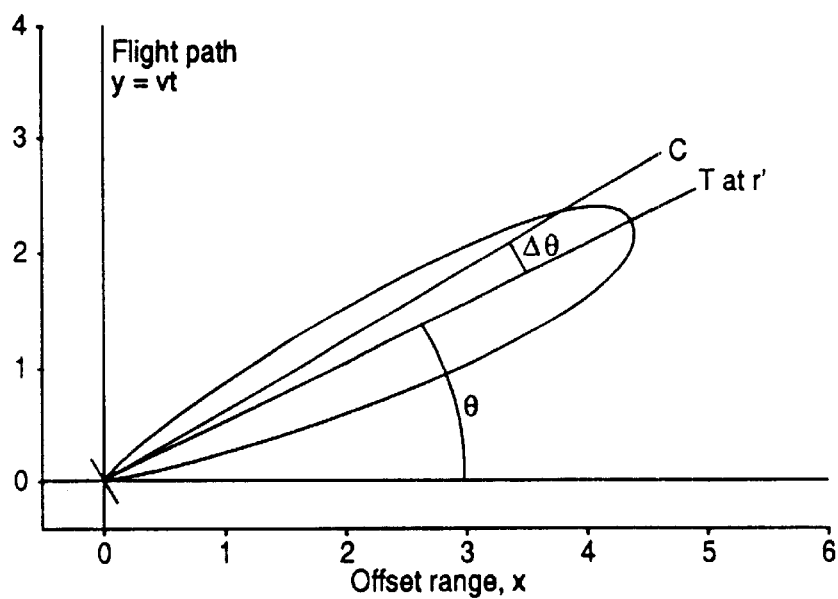
FIG. 11 is a plot of the moving target geometry with respect to the flight path (ground track) of the surveillance satellite.

Referring now to FIG. 11, the following is described with respect to a system operating at 10,000 kilometers with a range resolution of one meter and capable of synthetic aperture radar (SAR) processing to an azimuth resolution of 3.6 meters. A new monopulse anomaly technique has been developed to detect the difference between moving targets and stationary targets. The monopulse anomaly technique is based on the following difference between stationary and moving targets: A stationary target has the same antenna angle computed from its relative doppler shift as its antenna angle computed from its monopulse measured angle; and, a moving target has a different angle computed from its relative doppler shift as its antenna angle computed from its monopulse-measured angle. If such an anomaly exists, then a moving target is identified. For example, if the antenna is pointed forward of broadside by θ degrees and the spectrum has shifted down so the center of the beam has a translated doppler shift of 0 Hz. If the moving target is closing along the center beam, the moving target will have a monopulse antenna angle of 0, but a doppler angle which is greater than 0. A point forward of the beam center by Δθ has the same doppler shift as the moving target but at a different monopulse. angle (Δθ) than the moving target. In this case, the moving target exhibits monopulse anomaly but the stationary target does not.

Figure 12:
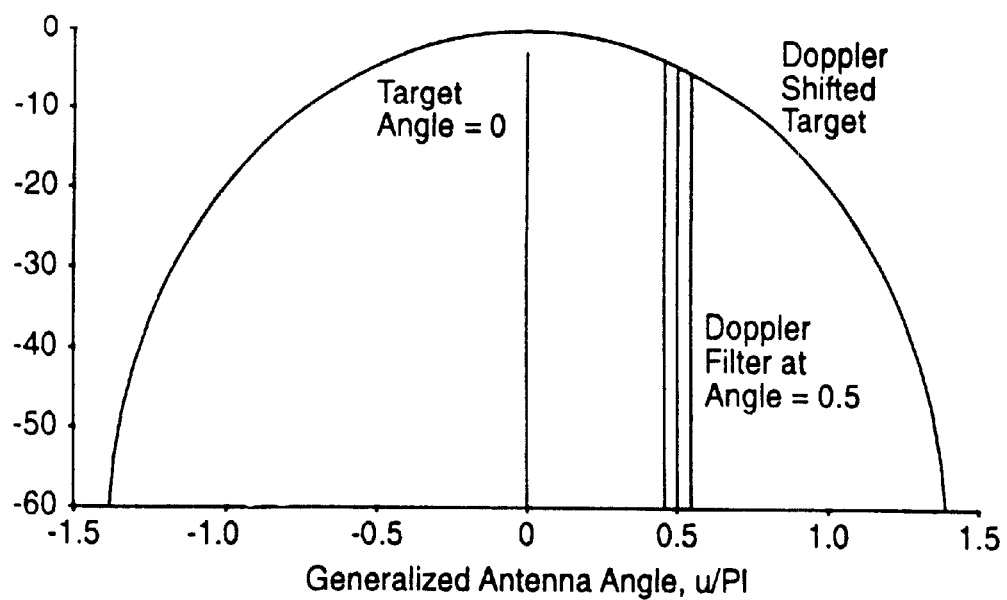
FIG. 12 is a plot of power versus antenna angle of a preferred embodiment.

Referring now to FIG. 12, a frequency plot of a moving target in a similar fashion is illustrated. The moving target is an antenna angle of 0 with a closing rate such that its doppler shift puts its return in a doppler shift filter at the generalized angle, 0.5. Generalized angle is computed from the system parameters and the center frequency of the doppler filter would be 0.5 while the monopulse measurement would indicate the moving target is at an antenna angle of 0. In a practical sense, there are errors, principally in the monopulse antenna angle measurement. Therefore, if the difference in angle exceeds a threshold by a predetermined probability that the monopulse angle measurement of a stationary target can give the same value as the monopulse angle measurement of the moving target, then, with a certain probability, a moving target is declared. In addition to the monopulse anomaly, moving targets can exhibit bandwidth due to acceleration of any of their 6 degrees of freedom (roll, pitch, yaw, translation, surge, heave and sway). If the target bandwidth is larger than the radar processor bandwidth, then the target return lies in more than one filter. Moving targets whose bandwidths are large when compared with radar processor bandwidth will be determined unstable moving targets. Moving targets whose bandwidths are small when compared with the radar processor bandwidth will be termed stable moving targets. Here the target bandwidth is modeled, for unstable targets, as 0.075 m/s (0.27 kph–5 Hz at radar frequency of 10 GHz). Large low speed moving targets traveling on smooth surfaces are stable moving targets. Moving targets with bandwidths less than 0.1 Hz at speeds of 4 kph would have to be big and be traveling on a very smooth surface.

Figure 15:
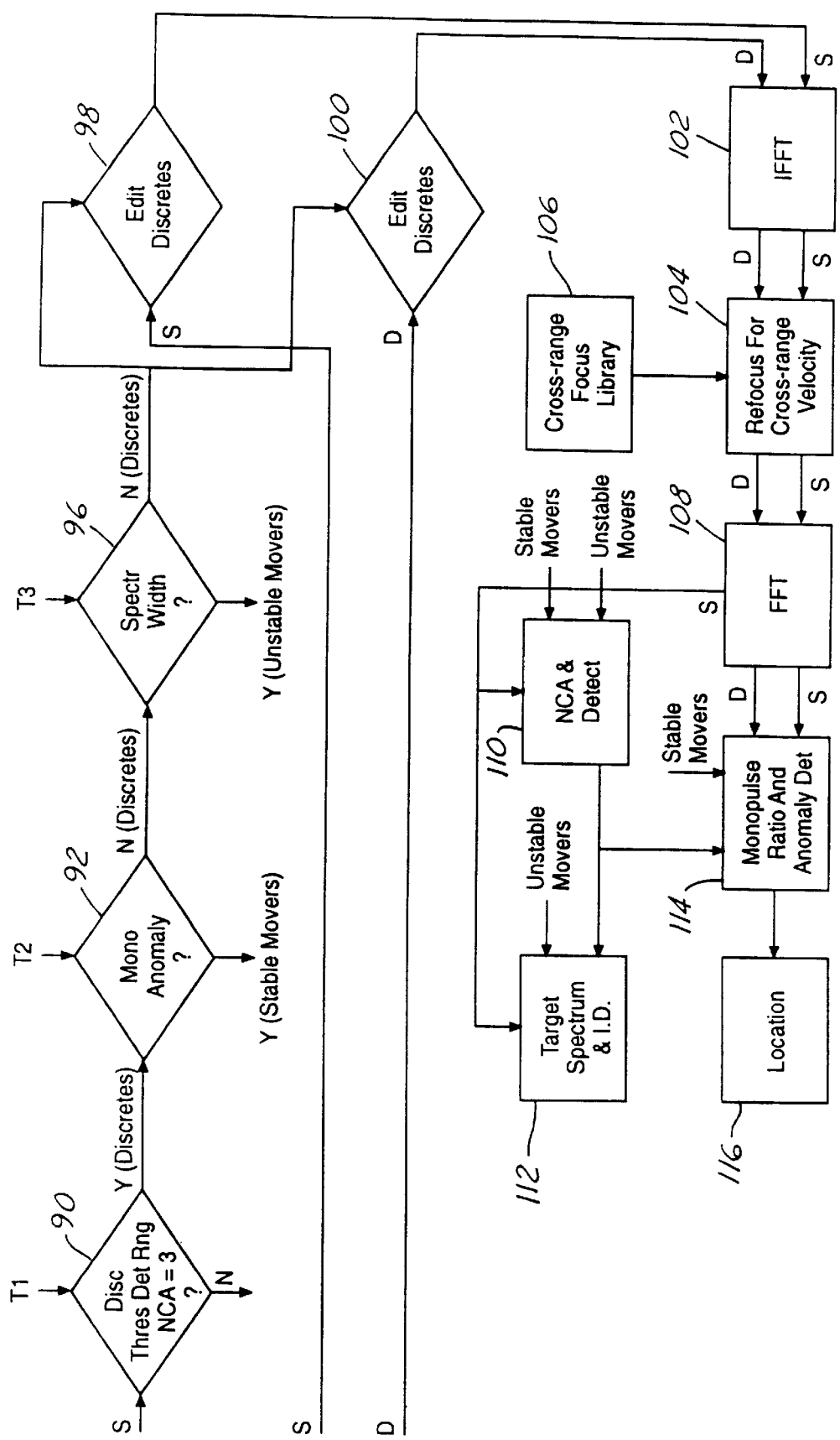
FIG. 15 is a block diagram of the architecture of the moving target indication algorithm according to the present invention.

Referring now to FIG. 15, non-coherent additions (NCAs) will be carried on range and/or azimuth as various points in the overall processing. The sum channel (S) and the difference channel (D) data is SAR processed as the antenna beam is moved along the ground by the radar. The azimuth resolution is constant with range. In block 90, the discrete threshold block determines that the moving target or discrete signal plus noise power exceeds the threshold T1. The threshold T1 and the threshold T2 from block 92 are set for the probability is at a predetermined level. For example, 0.85. This detection identifies which range-doppler cells exceed the threshold so that they can be edited out of the non-coherent edition image if these cells do not have monopulse anomaly or a spectrum width consistent with movers. As will be described below, the Y output of the discrete threshold can include some strong unstable movers. However, they will be identified in block 98 below. If the threshold is exceeded, block 92 is performed in which monopulse anomaly detection is performed.

Figure 13:
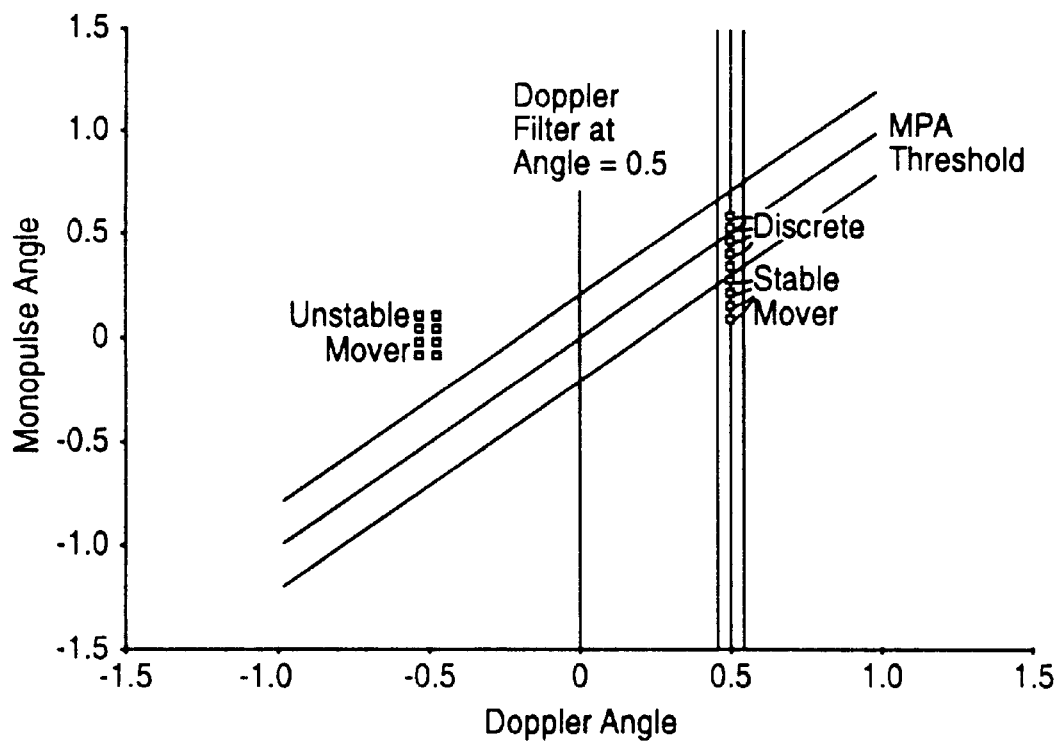
FIG. 13 is a plot of monopulse angle versus doppler angle of a preferred embodiment.

FIG. 13 shows how the stable movers, unstable movers and discretes might appear on a plot of monopulse angle vs. doppler angle. The unstable mover is shown at a doppler angle of −0.5 and a monopulse angle of 0. Note that several independent monopulse measurements are scattered about the mean monopulse angle of 0 and that each measurement is extended over several doppler filters. The stable mover is shown at a doppler range of +0.5 and a monopulse angle of 0.2. Note that several independent monopulse measurements are scattered about the mean monopulse angle of 0.2 but that each measurement is in one doppler filter. The discrete is shown at a doppler angle of +0.5 and a monopulse angle of 0.5. Note that several independent monopulse measurements are scatter about the mean monopulse angle of 0.5 but that each measurement is in one doppler filter.

The radar cross section (RCS) of moving targets is exponentially distributed. The mean value for the RCS falls between 24 dBm$^2$ and 10 dBm$^2$.

The mean ground speed for these moving targets is between 4 kilometers per hour (kph) and 100 kph. The moving targets are assumed to be 3 m×3 m in range×azimuth extent.

If the intrinsic bandwidth of the target is larger than the radar processor bandwidth, the target is called an unstable moving target; if the target's bandwidth is equal to or less than the radar processor bandwidth the target is called a stable moving target. The intrinsic bandwidth of most moving targets is defined here to be 0.075 m/s (0.27 kph–5 Hz at a radar frequency of 10 GHz).

The backscatter coefficient ($\sigma_0$) of the ground clutter is represented as a "constant-$\gamma$" model where $\sigma_0 = \gamma \sin(\alpha)$, where $\alpha$ is the grazing angle. $\gamma$ (dB) −5 for the designs here.

Figure 14:
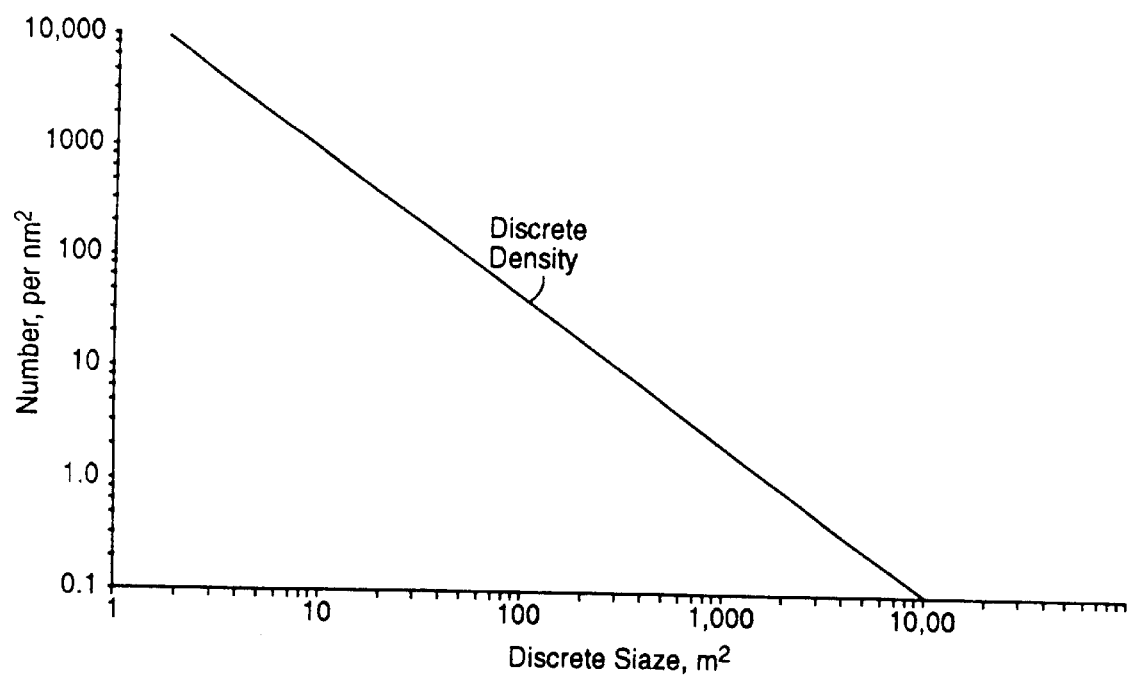
FIG. 14 is a plot of the spatial density of discrete scatterers used to calculate the false-alarm rate performance of the present invention.

Discretes are stationary targets; each discrete has an exponentially distributed RCS. The density (number/nm$^2$) of the discrete means is shown in FIG. 14. The discretes have a mean ground speed of 0 kph. The discretes are assumed to be 3 m×3 m in range×azimuth extent. There is no scintillation of the discrete radar returns over a change of 0.25° (discrete data was taken at X-band).

In block 92, if no anomaly is detected for a given target, then that target is declared to be discrete and its range-doppler position is edited in the non-NCAed sum and difference D images. For a meal altitude design, any stable movers that pass the monopulse anomaly test will not have their range-doppler positions passed to the discrete editing process. Unstable movers will have TIRs per filter which are greatly reduced by the spreading of the target RCS return across many doppler filters. They will pass the spectrum width test and not be edited with the discretes.

In block 96, the spectrum width test is based on the F-ratio test of statistics. Here, the ratio of the average power of $M_1$ cells in the numerator to the average power of $M_2$ cells in the denominator is compared with statistical distribution of numbers M, $M_1$ and $M_2$, given the power ratio of interest. The ratio test is done by estimating the probability that the observed ratio would occur if the numerator and denominator were samples from the same distribution. If the ratio is high, then it is unlikely that the numerator and denominator samples from the same statistical distribution would give this ratio; if the ratio is low, then it is likely that the numerator and denominator average powers are samples from the same distribution. As each declared discrete comes from the monopulse anomaly detection block, its surrounding cells are F-ratio tested and against a denominator set of cells from a detection-free region to see if they have an average numerator power from the same distribution. If the probability of the ratio is low enough, the detected cell is assumed to be from the interference or a discrete. Otherwise, the detected cell is assumed to be from a doppler-spread unstable mover. The discretes are edited in block 100 and 98. The sum and difference radar channels S and D are inputs to edit discrete blocks 98 and 100. The non-NCAed image data from the sum and difference radar channels are inputs and the also image locations (the range and doppler cells) of the probable discretes from block 96. These locations are edited out of the image data to prevent discretes from being frequency smeared once the cross-range refocus operations. The edited discretes are processed by inverse fast forward transform in block 102. The block 102 recovers the sum and difference raw data from the two edited discrete blocks 98,100 and provides the edited sum and difference raw data to the cross-range velocity block 104. The block 104 refocuses, in sequence, a number of possible cross-range velocity refocus operations to focus the data that may be from moving targets with such cross-range velocities.

An input to block 104 is the cross-range focus library. The moving targets will have a component of velocity along the range vector (line of sight) and another component of velocity which is cross-range. The component of the cross-range velocity is collinear with the satellite velocity and causes defocusing of the target image because the processor focus is nominally calculated from the satellite velocity only. The refocusing of the moving targets with a cross-range velocity component is accomplished in sequence using a "library" of trial refocus velocities. The size of this library depends on the altitude, the radar transmitter frequency, the variation in grazing angle of the radar coverage, the maximum cross-range velocity to be covered, and the allowable quadratic phase error of the radar impulse response. At medium earth orbit altitude and a typical set of choices of parameters, the library size varies from 51 to 71 as a function of grazing angle. The output of the refocus block 104 is coupled to fast fourier transform block 108. Fast fourier transform block converts, in sequence, the refocused edited raw data collections into sum and difference image non-NCAed data with discretes edited out and a number of cross-range velocities applied to the edited raw data. Thus, each of a sequence of sum and different images is generated with essentially no discretes and maximum image values for targets with selected cross-range velocity. The sum (S) images are presented to the NCA and detect block 110. And the target spectrum and identification block 112. The sum (S) and difference (D) images are presented to the monopulse ratio block 114 for location of detected movers whose range-doppler coordinates are set from the NCA and detect block 110. In NCA and detect block 110, unstable movers will have returns from their radar cross section (RCS) spread over about 50 filters. To accomplish detection probability of 0.85 with low false alarm rates, it is necessary to recover the total TIR required to meet these probabilities from the 50 filters in which the target return lies. This is accomplished by non-coherent addition, using a higher false alarm rate that applies to these unstable targets, and using more average power than for non-spread targets. As the number of independent NCAs increases, the distribution tends toward gaussian. The distribution of the number of averages of the NCAs has a mean value tending toward 1 and the variance tends toward 1/n. In this example, the number of NCAs is 150 (3 rain cells×50 doppler cells) so the distribution of n=150 samples is taken to be gaussian. The number of cells tested per kilometer$^2$ has changed from $10.8 \times 10^{-6}$ to $540 \times 10^{-6}$. The power $P_{FA}$ required to meet the false alarm rate has, accordingly, increased.

For unstable targets and a FAR of 0.005/km$^2$, the false alarm probability is $2.7 \times 10^{-6}$. These are total false alarm rates interpreted to mean declaring a discrete or clutter return to be a moving target. The FAR determines the $P_{FA}$ for the NCA and Detection block 110. For unstable targets, FAR=0.005/km², $P_{FA}$=2.7×10⁻⁶, TIR–108.6 watts and $P_D$–0.85. For a FAR of 0.1/km², the false alarm probability is 5.4×10⁻⁵. For unstable targets and $P_{FA}$=5.4×10⁻⁵, TIR= 95.72 watts and $P_D$–0.85.

For stable targets and a FAR of 0.005/km², the false alarm probability is 5.4×10⁻⁸. These are total false alarm rates interpreted to mean declaring a discrete or clutter return to be a moving target. The FAR is the product of $P_{FA}$ for the Discrete Threshold Detection block and the $P_{FA}$ for the final Monopulse Anomaly Detection block (that outputs Location information). For stable targets, FAR of 0.005/km², the $P_{FA}$=5.4×10⁻⁸. The Discrete Threshold Detection block has a $P_{FA}$=1.3416×10⁻⁴, so the final Monopulse Anomaly Detection block must have a $P_{FA}$ of 4.1091×10⁻⁴ to give a total $P_{FA}$ of 5.4×10⁻⁸. If the stable movers are 13.08 dBm² or larger, the $P_{FA}$ of the final Monopulse Anomaly Detection block will be provided by another threshold.

Thus, for a FAR of 0.005/km², the false alarm probability is 5.4×10⁻⁸ for large stable targets (RCS 13.08 dBm²), TIR=108.6 watts (using the power required for targets at FAR of 0.005/km²) and with $P_D$=0.85.

The Monopulse Ratio and Anomaly Detection block 114 provides 1) and estimate of the antenna angles of the (stable and unstable moving) targets through the use of monopulse and 2) reduces the $P_{FA}$ for stable targets through the use of monopulse anomaly effect as before.

The Location block 116 provides, for all moving targets: 1) the range and range rate (which is derived from the doppler frequency and the monopulse angle data), 2) the cross-range velocity through use of the cross-range focus value used in the refocus block and 3) the antenna angle estimated by the final monopulse ratio.

The Target Spectrum and Identification block 112 measures the characteristics of the spectra of unstable movers. These are expected to include spectra width and patterns. The particular characteristics measured will be identified as a particular target type, based on the characteristics measured in test programs (see the introductory remarks for this description). It is also possible that the type of surface over which the target is traveling may be identified. Any target with a spectrum width (moving or stationary) will have its spectrum (3 coherent range cells×50 doppler cells) sent to the Target Spectrum and Identification block. Thus, vibrating stationary targets may be identified.

While particular embodiments of the invention have been shown and described, numerous variations alternate embodiments will occur to those skilled in the art. Accordingly, it is intended that the invention be limited only in terms of the appended claims.

What is claimed is:

1. A method of classifying an object from a satellite comprising:

generating a signal from the satellite;

receiving a reflected signal from the object;

determining a first antenna angle of the object from a doppler shift of the reflected signal;

determining a second angle of the object from a monopulse measured angle of the reflected signal;

calculating a difference of the first angle and the second angle; and determining whether the object is moving based on the difference.

2. A method as recited in claim 1 further comprising determining that the object is moving when the difference is greater than a predetermined threshold.

3. A method as recited in claim 1 further comprising determining that the object is stationary when the difference is less than a predetermined threshold.

4. A method as recited in claim 1 further comprising determining a velocity of the object in response to said difference.

5. A satellite for classifying an object comprising:

a satellite body;

a surveillance antenna coupled to said satellite body;

a controller coupled to the antenna generating a first signal through the surveillance antenna and receiving a reflected signal through the antenna, said controller determining a first antenna angle of the object from a doppler shift of the reflected signal; determining a second angle of the object from a monopulse measured angle of the reflected signal, calculating a difference of the first angle and the second angle, and determining whether the object is moving based on the difference.

6. A satellite as recited in claim 5 wherein said controller determines that the object is moving when the difference is greater than a predetermined threshold.

7. A satellite as recited in claim 5 wherein said controller determines that the object is stationary when the difference is less than a predetermined threshold.

8. A satellite as recited in claim 5 wherein said controller determines a velocity of the object in response to said difference.

9. A satellite as recited in claim 5 further comprising a bidirectional downlink/uplink antenna coupled to said satellite body.

10. A satellite as recited in claim 5 further comprising a plurality of high bandwidth radio frequency or optical crosslinks coupled to said satellite body.

11. A satellite as recited in claim 5 further comprising a medium bandwidth directed broadcast downlink coupled to said satellite body.

12. A satellite as recited in claim 5 further comprising a low bandwidth uplink receiver coupled to said satellite body.

\* \* \* \* \*

UNITED STATES PATENT AND TRADEMARK OFFICE
CERTIFICATE OF CORRECTION

PATENT NO. : 6,611,226 B1  Page 1 of 1
DATED : August 26, 2003
INVENTOR(S) : David A. Jones et al.

It is certified that error appears in the above-identified patent and that said Letters Patent is hereby corrected as shown below:

Title page,
Item [73], please insert:
-- [73] Assignee: Hughes Electronics Corporation, El Segundo, CA (US) --; and
, insert -- *Attorney, Agent or Firm*: V. D. Duraiswamy, M.W.
Sales --.

Signed and Sealed this

Thirteenth Day of January, 2004

JON W. DUDAS
*Acting Director of the United States Patent and Trademark Office*